E. H. HILL,
Assignor to WASHBURN & MOEN MANUFACTURING CO.
Zinc Coated Wire.
No. 9,761. Reissued June 14, 1881.
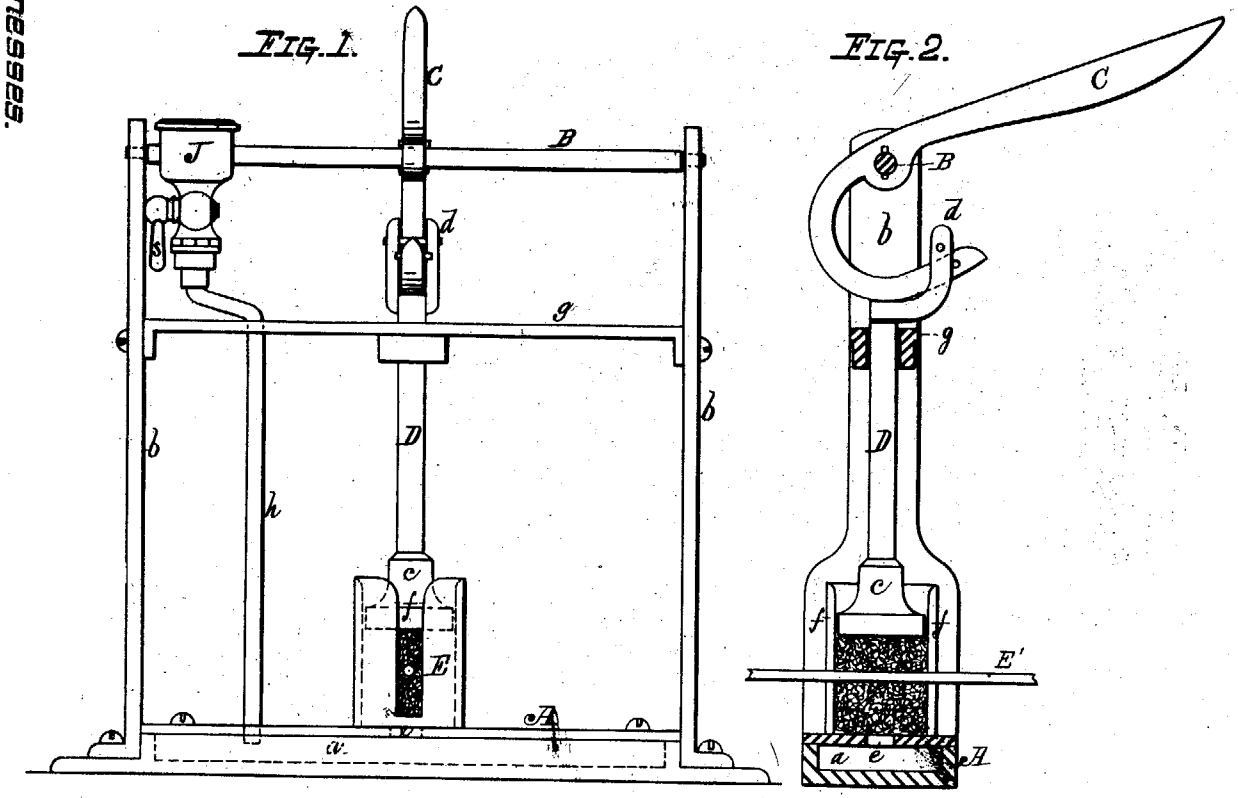
Witnesses.
Thos. H. Dodge
Edwin E. Moore
Inventor:
Edwin H. Hill

UNITED STATES PATENT OFFICE.

EDWIN H. HILL, OF WORCESTER, MASSACHUSETTS, ASSIGNOR TO WASHBURN & MOEN MANUFACTURING COMPANY, OF SAME PLACE.

ZINC-COATED WIRE.

SPECIFICATION forming part of Reissued Letters Patent No. 9,761, dated June 14, 1881.

Original No. 204,571, dated June 4, 1878. Application for reissue filed November 15, 1880.

DIVISION B.

*To all whom it may concern:*

Be it known that I, EDWIN H. HILL, of the city and county of Worcester, and Commonwealth of Massachusetts, have invented an Improvement in Zinc-Coated Wire, the same constituting an improved article of manufacture; and I do hereby declare that the following is a full, clear, and exact description of the same, reference being had to the accompanying drawings, forming a part of this specification, and in which—

Figure 1 of the drawings represents a side view of a machine or apparatus employed, in this instance, in the manufacture of my said improved zinc-coated wire, and Fig. 2 is a vertical transverse section thereof.

To enable those skilled in the art to which my invention belongs to make and use the same, I will proceed to describe it more in detail.

In the annexed drawings the letter A designates a preferably metallic base containing a chamber, *a*, and carrying two spaced uprights, *b*, that afford bearings in their upper ends to a shaft, B, upon which is fulcrumed a cam-lever, C, The weight end of this lever is of hook form, and engages the slotted upper end, *d*, of a metallic plunger, D, having on its lower end a foot, *c*, fitting snugly in a metallic cup, E, upon the base. This cup communicates at its bottom with the chamber *a* by a means of an orifice or orifices, *e*, and is slotted on directly-opposite sides, as shown at *f*, for the purpose of admitting the wire E′. This cup is partly filled with asbestus or other suitable fibrous and non-inflammable material. The end of the wire is then passed through the slots *f* aforesaid and covered by a suitable quantity of the said material, which thus encompasses or surrounds the wire and forms a wiper, through which the wire passes, the cup E serving the purpose of retaining the wiping substance in position about the wire E′. By depressing the power end of the cam-lever C the plunger-head enters the cup E and forcibly compresses and hardens the packing therein. As the wire is drawn through the cup after leaving the bath of melted zinc, all surplus zinc is wiped off therefrom by the said non-inflammable fibrous substance, and it leaves the said cup in a highly-polished, smooth, and finished condition, being also lubricated by the oil drawn up by the asbestus from the chamber *a* by capillary action.

Instead of the cam-lever above mentioned, I may use an ordinary screw to raise and depress the plunger or any of the usual mechanical expedients commonly used for similar purposes. The plunger is guided during its movements by being passed through a brace, *g*, connecting the frame-uprights.

The chamber *a* is supplied with the lubricant used from an oil-cup, J, above it, and connected therewith by a pipe, *h*, the supply being regulated or cut off entirely by means of a stop-cock, *s*.

It will thus be seen that iron or steel wire coated in the manner described, by zinc—non-corrosive metal—while in a molten state, gives to the public an improved article of manufacture of great practical merit.

As wire was coated before my said invention by zinc in a molten state it was comparatively rough, and one feature of such roughness consisted in little undue accumulations of the molten metal upon one side of the wire, and which was owing to the molten metal running down and cooling upon the under side of the wire, after the wire left the molten bath. Other roughness was due to particles of sand adhering to the wire as it passed through the sand covering to the molten bath. Those skilled in the art will readily understand this. The top of the bath of molten metal is covered by sand to prevent, as much as possible, the contact of the air with the molten bath.

My improved wire is free from all the above defects and imperfections. The rface, in addition to being coated, is smooth and even, since all sand and surplus metal is rubbed off, and the entire surface of the wire is left in a uniform and highly-polished condition.

Those skilled in the art to which my invention belongs will understand the practical importance of the same, since to apply a zinc coating to wire necessitates the melting of the zinc, and consequently the metal wire, with its molten coating, as it leaves the molten bath, is raised to a high degree of heat, and under the old modes of operation, prior to my said invention, the zinc coatiag was not uniform and even, for the reason that no means had then been devised for rubbing down and off the surplus metal. Combustible fibrous material could not be employed, for the reason that it burns up and the residue would adhere to the wire, the surface of which would be rendered by such operation more objectionable than if the wire was allowed to run through without any such attempt to remove the surplus metal. Then, again, running the wire through sand or charcoal left the zinc coating comparatively rough and uneven, even where the molten metal did not run down and adhere to the wire in small lumps or bunches.

All these difficulties and objections are obviated by my invention. The asbestus or non-inflammable fibrous substance wraps closely and perfectly about the heated wire and its molten covering, thereby forcing the melted zinc into the cracks and evenly over the surface of the wire and removing all surplus metal. The non-inflammable wiper also smoothes and polishes the zinc coating in a very perfect manner.

In those cases, particularly where it is necessary to have uniform size or even gage of wire, my invention is of great practical value, and in all cases enables the manufacturer to zinc or metal coat his wire in a much more perfect and satisfactory manner. The difference is so great between wire coated in the old way and by my invention that such difference is at once perceived both by the sense of sight and touch as it is put on the market; and, furthermore, in practical use the difference is made still more apparent, since zinc-coated wire as furnished to the trade prior to my said invention when bent would scale up, thereby leaving the surface of the wire exposed to oxidation and rust, whereas my improved zinc-coated wire does not scale up when bent, but remains smooth, thereby leaving the wire fully protected.

Having now fully described the said invention and the manner of carrying the same into effect, I would observe, in conclusion, that I do not claim, broadly, zinc-coated wire, for this has long been in common use; nor do I claim the process and apparatus for finishing zinc-coated wire as heretofore set forth by simultaneously rubbing and smoothing the surface of the wire after it leaves the bath of molten zinc, for they form the subject-matter of another division of reissue and are claimed therein; but

What I do claim, and desire to secure by Letters Patent under this division of reissue, is—

The product of said process as an improved article of manufacture, to wit: the wire so covered with a smooth and polished coating of zinc, applied thereto substantially as set forth.

EDWIN H. HILL.

Witnesses:
THOS. H. DODGE,
EDWIN E. MOORE.